Figure 1:
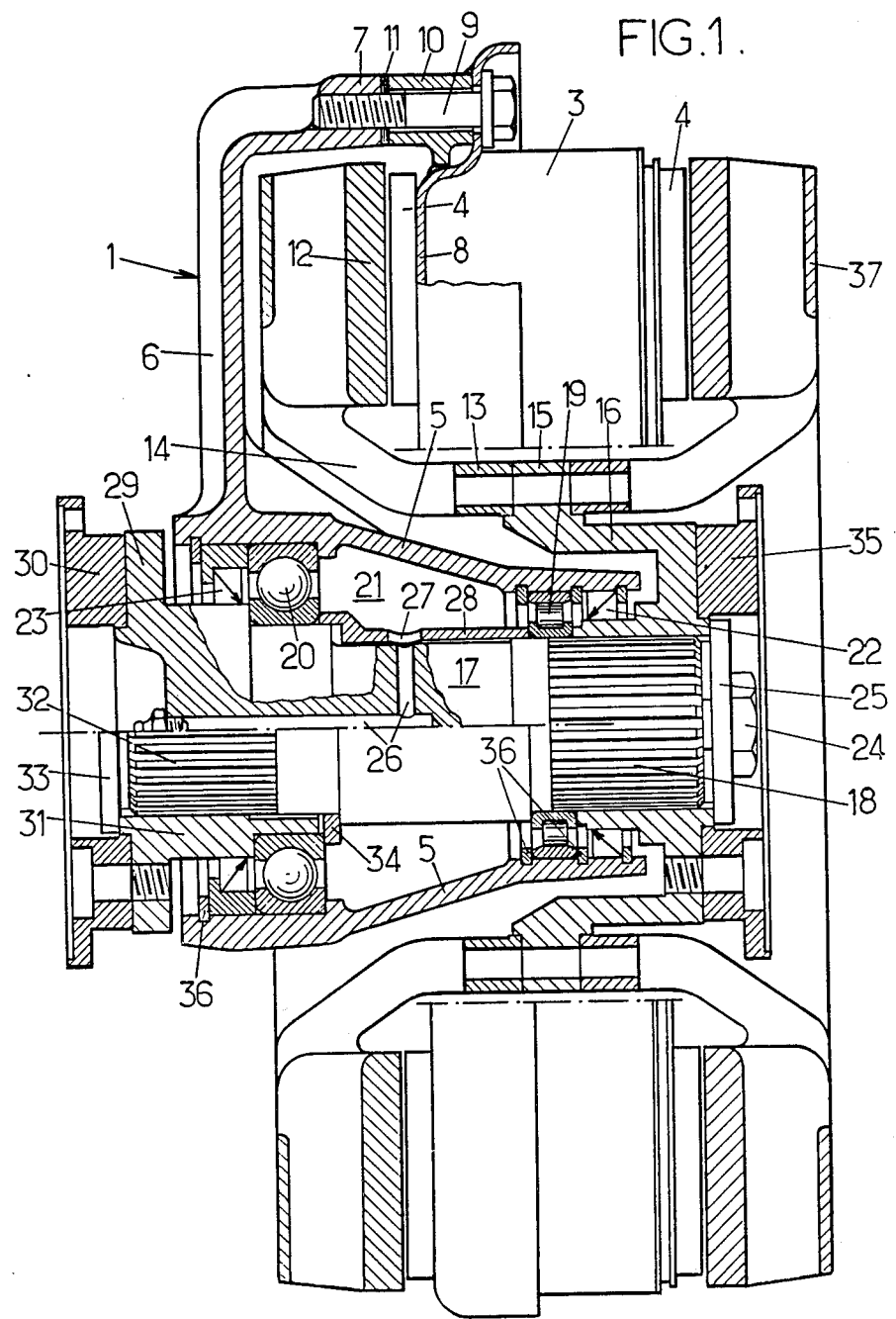

United States Patent [19]

Charbonnier et al.

[11] Patent Number: 4,791,330

[45] Date of Patent: Dec. 13, 1988

[54] EDDY CURRENT RETARDERS FOR VEHICLES

[75] Inventors: Marc Charbonnier, Franconville; Michel Durand, Cergy Pontoise, both of France

[73] Assignee: Labavia-S.G.E., France

[21] Appl. No.: 156,001

[22] Filed: Feb. 16, 1988

[30] Foreign Application Priority Data

Feb. 16, 1987 [FR] France ................... 87 01937

[51] Int. Cl.[4] .......................................... H02P 15/00
[52] U.S. Cl. ...................................... 310/105; 310/93
[58] Field of Search .................. 310/90, 93, 103, 105, 310/106, 156, 254, 261, 268

[56] References Cited

U.S. PATENT DOCUMENTS

| | | | |
|---|---|---|---|
| 3,050,647 | 8/1962 | Winther | 310/105 |
| 3,522,461 | 8/1970 | Geul | 310/93 |
| 3,553,507 | 1/1971 | Bessiere | 310/93 |
| 3,742,270 | 6/1973 | Jaeschke | 310/105 |
| 3,943,391 | 3/1976 | Fehr | 310/105 X |
| 3,974,408 | 8/1976 | Fehr et al. | 310/105 X |
| 4,309,633 | 1/1982 | Marandet | 310/105 |

Primary Examiner—Patrick R. Salce
Assistant Examiner—Marc S. Hoff
Attorney, Agent, or Firm—Larson and Taylor

[57] ABSTRACT

An electric retarder for vehicle is provided comprising on the one hand an inductor stator comprising a ring of electric coils (3) supported by an annular framework (1), which framework includes a central socket (5), radial arms (6) extending this socket and a ring (8) carried by these arms and supporting the coils, and on the other hand, an armature rotor comprising two magnetic disks (20) both connected, through rings of bent arms (14), to a central collar (15), itself secured angularly to a section (17) of the shaft of the vehicle to be slowed down. The socket has a truncated cone shape, the collar is connected to a central cylindrical pot (16) covering the narrow end of the socket and the shaft section is mounted in this socket via a small bearing (19) housed in the pot and a large bearing (20), of the axial thrust type, disposed at the widened end of the socket.

3 Claims, 2 Drawing Sheets

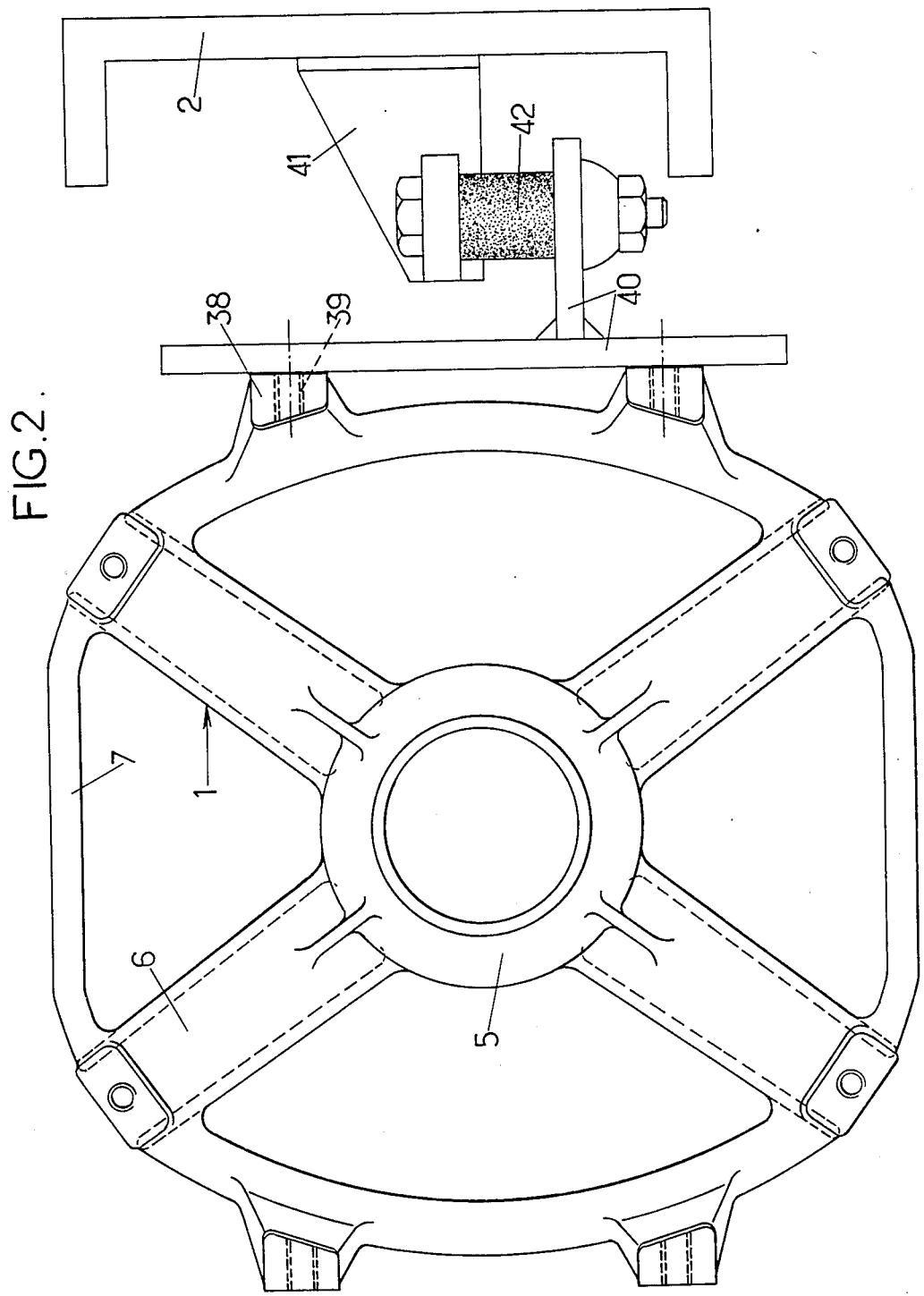

EDDY CURRENT RETARDERS FOR VEHICLES

The invention relates to electric or eddy current retarders for vehicles and particularly those having:
- an inductor stator itself comprising a ring of electric coils with axis parallel to the axis of the retarder, supported by an annular framework,
- and an armature rotor comprising two magnetic material disks which axially enclose the ring of coils and which are both connected, through rings of bent arms, to a central collar itself connected angularly with a section of the transmission shaft to be retarded of the vehicle.

The invention relates more particularly still, among the retarders considered, to those in which the annular framework includes a central socket penetrating into the rotor, radial arms extending this socket externally, a ring carried by these arms and supporting the coils, and bearing surfaces for fixing the framework on the chassis of the vehicle, in particular to longitudinal members disposed horizontally on each side of the retarder, parallel to its axis, said shaft section to be slowed down being mounted inside the socket by means of two bearings.

In known constructions of this kind, which have been described in the U.S. Pat. No. 3,553,507, the two bearings are identical tapered bearings mounted with opposite slants and these bearings are juxtaposed axially in the middle of the axial extent of the socket, of general cylindrical conformation; in addition, the rotor is mounted cantilever fashion with respect to the set of two bearings.

These constructions have scarcely given satisfaction in practice, in particular from the point of view of robustness and stability of the rotor, especially for creating high retarding torques.

The object of the invention is especially to make retarders of the kind considered such that they overcome these drawbacks. For this, the retarders of the kind in question in accordance with the invention are essentially characterized in that their socket has a general truncated cone shape, in that the central collar of their rotor is connected to the shaft section by means of a pot with cylindrical side wall covering the narrow end of the socket and in that the two bearings housed in this socket are a relatively small bearing disposed in the vicinity of said narrow end of the socket, inside the pot-collar assembly, and a relatively large bearing adapted for absorbing the axial forces and disposed in the vicinity of the widened end of the socket.

In preferred embodiments, recourse is further had to one and/or other of the following arrangements:
- the large bearing projects axially beyond the axial dimension of the rotor,
- the two bearings are disposed in the same grease housing closed by two seals mounted in both ends of the socket.

Apart from these main arrangements, the invention comprises certain other arrangements which are preferably used at the same time and which will be more explicitly discussed hereafter.

In what follows, a preferred embodiment of the invention will be described with reference to the accompanying drawings in a way which is of course in no wise limitative.

FIG. 1, of these drawings, shows in axial section an electric vehicle retarder constructed in accordance with the invention, as well as the end shaft on which the retarding torques are applied.

FIG. 2 shows an end view of a component of the stator of this retarder and some elements for mounting this component on a vehicle chassis.

In a way known per se, the retarder considered includes an inductor stator and an armature rotor.

The stator comprises:
- a framework 1 intended to be fixed on the chassis of the vehicle and, more precisely, on two parallel longitudinal members 2 (FIG. 2) forming part of this chassis,
- and a ring of electric coils 3 carried by this framework, each coil surrounding a magnetic core extended at both ends by pole shoes 4, which forms two rings of magnetic poles with alternating polarities in steps.

Framework 1 itself comprises a central socket 5 extended at one of its axial ends by radial arms 6, the ends of these arms being connected together by a hoop 7, and this hoop supports a ring 8 through which pass the cores of coils 3.

Ring 8, whose peripheral edge is bent back axially in the manner of the edge of a bowl, is mounted on hoop 7 by means of bolts 9, strengthening sleeves 10 and adjustment washers 11.

The rotor comprises:
- two disks 12 made from a magnetic material intended to be the seats of eddy currents, mounted so as to be able to travel respectively past the two rings of inductor poles, at a short axial distance therefrom forming an air gap, each disk being fixed to a fixing ring 13 by means of a ring of arms 14 bent not only axially but also transversely, which arms form cooling fins,
- and a central collar 15 on which the two rings 13 are bolted, the collar being itself secured, by means of an annular piece 16, to a shaft end 17 forming part of the transmisson shaft to be slowed down of the vehicle considered.

The angular fixing between the shaft end 17 and the annular end piece 16 is provided by the cooperation of complementary splines 18.

The shaft end 17 is supported and guided by two bearings 19 and 20 housed in socket 5.

To reduce as much as possible the cantilevered mounting of the rotor, one of these bearings should be "axially sunken" as far as possible towards the inside of this rotor, although the diameter of the inner space available for receiving this bearing is relatively small.

At least one of the two bearings should form a robust axial stop for withstanding the very high axial loads which are applied to the transmission shaft of the vehicle, and so to the shaft end 17, because of the deflection of the live axle of this vehicle, which involves for this bearing relatively large dimensions and particularly relatively large inner and outer diameters.

To comply simultaneously with these two contradictory requirements, socket 5 is here given a form widening outwardly of the rotor and relatively elongate, one of the two bearings 19 is formed by a small bearing, which is disposed in the vicintiy of the narrowed end of the socket, and the other bearing 20 is formed by a large axial thrust bearing disposed in the vicinity of the widened end of the socket.

Furthermore, the annular piece 16 here has the form of a pot whose side wall has a generally cylindrical shape and envelopes the narrow end of socket 5, and the small bearing 19 is disposed axially inside the assembly formed by pot 16 and collar 15 which extends the edge of this pot outwardly.

Thus, the center of gravity of rotor 12-15 is situated at a point, on the axis of this rotor, inside the small bearing 20 or even between the two bearings, which provides excellent support and centering for this rotor despite the apparent complication of the proposed construction.

The large bearing 20 projects preferably axially beyond the overall axial dimension of the rotor.

The inner diameter of the small bearing 19 is smaller than that of the large bearing 20, so that the small bearing 19 surrounds a portion of relatively small diameter of the shaft end 17 whereas the large bearing 20 is mounted on a stepped portion of larger diameter of said shaft end.

The two bearings 19 and 20 are disposed in the same grease housing 21 defined externally by socket 5 itself and internally by a portion of the shaft end 17, said housing 21 being further sealed by two end seals 22 and 23.

The pot 16 is fixed axially on the shaft end 17 by screwing a bolt 24 into an axial threaded bore of said shaft end, which results in applying the edge of a circular plate 25, through which said bolt passes, axially against said piece 16.

Two distinct embodiments are shown respectively at the top and at the bottom of the left hand part of FIG. 1, and correspond respectively to two distinct ways of feeding housing 21 with grease.

In the construction at the top, this feed takes place on the inside, through passages 26 formed in the shaft end 17 and an aperture 27 formed in a tubular spacer 28 inserted axially between the inner rings of the two bearings 19 and 20. In this case, shaft end 17 is fixed to a collar 29 against which coupling flange 30 may be bolted which forms part of another element of the transmission shaft or is readily connectable to this other element.

In the embodiment at the bottom, the grease supply for housing 21 may be provided from outside socket 5 through an intake not shown. In this latter case, shaft end 17 is connected to flange 30 by means of a collar 31 which is secured angularly thereto by means of splines 32 and axially by screwing a bolt (not shown) into an axial threaded bore in the shaft end considered, which results in applying the edge of a circular plate 33 through which said bolt passes axially against collar 31. The screwing in question also results in applying collar 31 axially against the internal ring of the thrust bearing 20 and this ring against a washer 34, itself applied axially against a stepped portion of the shaft end 17, which here replaces the tubular space 28.

In FIG. 1 can be further seen:
- a flange 35 for bolting to part 16 and forming part of another element of the transmisson shaft to be slowed down, or readily connectable to such another element,
- washers 36 of the "circlip" type housed in grooves formed inside socket 5 and ensuring the axial positioning of the seals 22, 23 and the external rings of the bearings,
- and annular rims 37 integrally molded with disks 12, their finned arms 14 and their fixing rings 13, said rings connecting together the ridges of the largest diameter portions of said arms so as to form between these portions channels for the cooling air.

In FIG. 2, in addition to framework 1 and to a supporting longitudinal member 2, the elements have been shown for fixing the first to the second, which elements include:
- four thick bearing surfaces 38 formed with threaded holes 39 having horizontal axes, which bearing surfaces are provided on hoop 7 at the rate of two superimposed bearing surfaces for each of the two sides of the hoop,
- a first bracket 40 bolted to the two superimposed bearing surfaces 38 on the same side,
- a second bracket 41 secured, for example by bolting, to the longitudinal member 2,
- and a resilient shock absorbing support 42 inserted vertically between the two brackets 40 and 41.

In an embodiment of the invention which has given every satisfaction and which is mentioned purely by way of illustration, the following values were adopted for some of the dimensions of the retarder:
overall diameter: about 60 cm,
inner and outer diameters of the small bearing 19: 7 and 12 cm,
inner and outer diameters of the large bearing 20: 9 and 16 cm,
axial spacing between the two bearings: about 10 cm Following which and whatever the embodiment adopted, an electric retarder is finally obtained whose construction and operation follow sufficiently from the foregoing.

This retarder has numerous advantages with respect to those known heretofore.

In particular, the weight of the rotor may be transmitted without fatigue to the stator through the small bearing 19 which is situated substantially at the axial level of its center of gravity. Furthermore, the large bearing 20 may be chosen with sufficient dimensions for correctly absorbing the axial thrusts because there is no limitation, at the axial level of the socket where it is situated, because of considerations of transverse dimensions.

Considering the excellence of ths distribution of the different weights and forces acting on the two bearings, the proposed approach makes it possible to adopt in practice prior art constructions which were mentioned in the introduction to the present description, which constructions have in particular the following advantages:

(a) the two rotor assemblies made from a molded magnetic material each formed by a disk 12, a ring of fins 14, a fixing ring 13 and a rim 37, were up to now reserved for assemblies, often called of the "focal" type, in which the stator of the retarder is mounted cantilever fashion on the casing of the live axle or of the gear box of the vehicle whereas its rotor, of the double disk type, is mounted cantilever fashion on the shaft end projecting from this casing: these rotor assemblies were not applicable to retarders of the "independent" type, that is to say comprising a stator mounted between the longitudinal members of the vehicle and a rotor connected between two standard portions of the transmission shaft. The same observation may be made for the stator assembly comprising the ring of coils and its support ring.

In the present case, the rotor and stator assemblies which have just been defined may be used equally well for retarders of both types since each of them includes respectively a central collar and a hoop of the type designated respectively by references 15 and 7 above, to which they may be fixed by simple bolting.

This advantage is important in that it makes possible the construction of retarders on a larger scale with substantial reductions in stocks.

(b) Socket 5, inserted between disks 12 which are greatly heated by the eddy currents and the bearings, plays the role of a heat screen between these disks and these bearings, which avoids overheating thereof and of their lubricant.

(c) It is possible to remove the essential parts of the retarder (coils, rotor assemblies) for repair thereof without breaking the transmission shaft, which means that the vehicle can continue to be used even under such conditions.

As is evident, and as it follows moreover from what has gone before, the invention is in no wise limited to those of its modes of application and embodiments which have been more especially considered; it embraces, on the contrary, all variants thereof.

We claim:

1. Electric retarder for vehicle, comprising an inductor stator itself comprising a ring of electric coils (3) with axes parallel to the axis of the retarder, supported by an annular framework (1), and an armature rotor comprising two magnetic material disks (12) which axially enclose the ring of coils and which are both connected, through rings of bent arms (14), to a central collar (15) itself connected angularly with a section (17) of the transmission shaft to be retarded of the vehicle, the annular framework including a central socket (5) penetrating into the rotor, radial arms (6) extending this socket externally, a ring (8) carried by these arms and supporting the coils, and bearing surfaces (38, 39) for fixing the framework on the chassis of the vehicle (2), said shaft section to be slowed down (17) being mounted inside the socket (5) by means of two bearings (19, 20), characterized in that the socket (5) has a general truncated cone shape, in that the central collar (15) of the rotor is connected to the shaft section (17) by means of a pot (16) with cylindrical side wall covering the narrow end of the socket and in that the two bearings housed in this socket are a relatively small bearing (19) disposed in the vicinity of said narrow end of the socket, inside the pot (16)-collar (15) assembly, and a relatively large bearing (20) adapted for absorbing the axial forces and disposed in the vicinity of the widened end of the socket.

2. Retarder according to claim 1, characterized in that the large bearing (20) projects axially beyond the axial dimension of the rotor.

3. Retarder according to claim 1, characterized in that the two bearings (19, 20) are disposed in the same grease housing (21) closed by two seals (22, 23) mounted in both ends of the socket.

* * * * *